United States Patent [19]
Siegel

[11] 4,411,326
[45] Oct. 25, 1983

[54] PLATFORM SCALE

[76] Inventor: Vernon Siegel, 5120 Brookfield La., Clarence, N.Y. 14031

[21] Appl. No.: 231,471

[22] Filed: Feb. 4, 1981

[51] Int. Cl.³ .......................... G01G 3/14; G01G 3/08
[52] U.S. Cl. ..................................... 177/211; 177/229
[58] Field of Search ................................ 177/211, 229

[56] References Cited

U.S. PATENT DOCUMENTS 3,512,595  5/1970  Laimins ........................... 177/211 X
4,082,154  4/1978  Pillote ................................. 177/211
4,212,197  7/1980  Kawai et al. .................... 177/211 X Primary Examiner—George H. Miller, Jr.
Attorney, Agent, or Firm—William H. McNeill

[57] ABSTRACT

A platform scale has at least three transducers carrying the platform. The transducers are mounted upon a base and are tangentially oriented with respect to a centerpoint. Thus, deformation of the transducers upon application of a force is translated into rotary movement of the platform, and stresses which cause inaccuracies are reduced or eliminated.

3 Claims, 6 Drawing Figures

PLATFORM SCALE

TECHNICAL FIELD

This invention relates to platform scales and more particularly to such scales having novel transducer mounting which increases the repeatability of measurement. It is useful in the treatment of dialysis patients whereby the measurement of very small weight changes is extremely important.

BACKGROUND OF THE INVENTION

Platform scales are known in the art. In the past, such scales have been mechanical or hydraulic, with a system of linkages, levers, or tubing to sum the forces of the individual supports to a central, force indicating display. With the advent of electronics, it has become desirable to provide an electrical output indication of the force applied. Such electrical outputs can be tallied remotely, tared automatically, and entered into computerized systems quickly and accurately.

These electronic scales frequently employ transducers that carry a portion or all of the load applied and produce an electrical output. The most accurate of such scales would be designed so that all of the load applied would be carried and resisted by the transducer or transducers to provide the highest output signal. If the platform is not large, a single centrally placed transducer may suffice. If the platform is large, then such a single transducer would be subject to not only the weight applied, but to considerable torque if the force is not applied through the force sensitive axis of the transducer. Design means are available to minimize the errors produced by torques but the effects cannot be eliminated completely. Large platforms generally use a plurality of transducers to attempt to provide a rigid, torque insensitive weighing means.

SUMMARY OF THE INVENTION

It is, therefore, an object of this invention to obviate the disadvantages of the prior art.

It is another object of the invention to enhance the accuracy of platform scales.

These objects are accomplished, in one aspect of the invention, by the provision of a platform scale which comprises a base member having a central point with at least three elongated transducers having two ends operatively mounted upon the base member by one of their ends. The transducers are substantially equally spaced apart and have their mounted ends substantially the same radial distance from the central point. The elongated bodies of the transducers are tangent to the central point. The other end of the transducers are formed to provide platform mounting means and a platform is mounted thereon.

This unique transducer mounting arrangement translates deformation of the transducers into rotational movement of the platform and effectively cancels out the stresses previously encountered by distorting torque in prior art systems.

DISCLOSURE OF THE PREFERRED EMBODIMENT

For a better understanding of the present invention, together with other and further objects, advantages and capabilities thereof, reference is made to the following disclosure and appended claims taken in conjunction with the above-described drawings.

Figure 1:
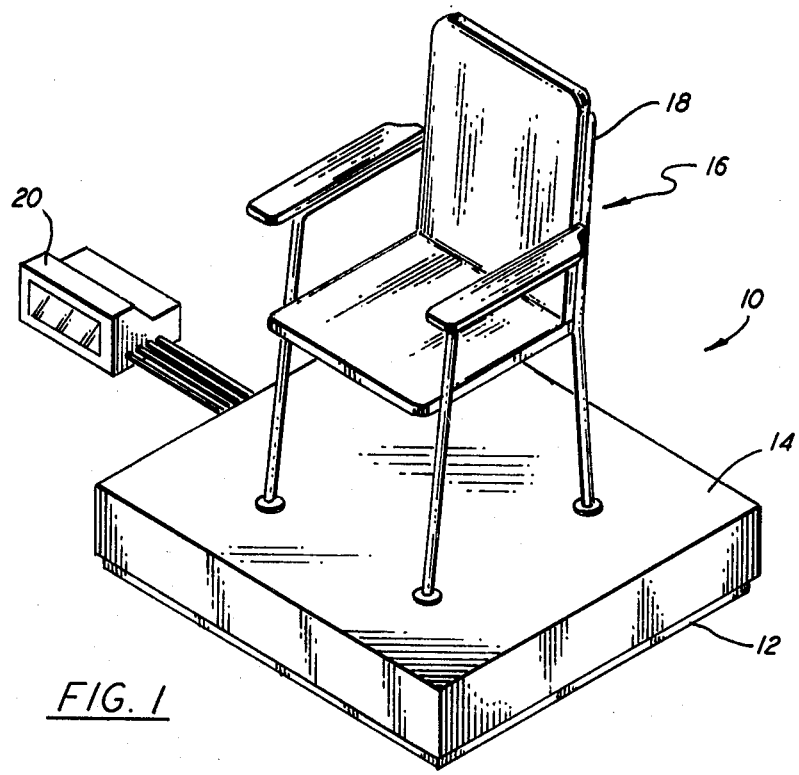
FIG. 1 is a perspective view of a platform scale.

Referring now to the drawings with greater particularity, there is shown in FIG. 1 a platform scale 10 having a base 12, a platform 14, load centering means 16 which, in this instance, is a chair 18 fixed to platform 14; and readout means 20.

Figure 3:
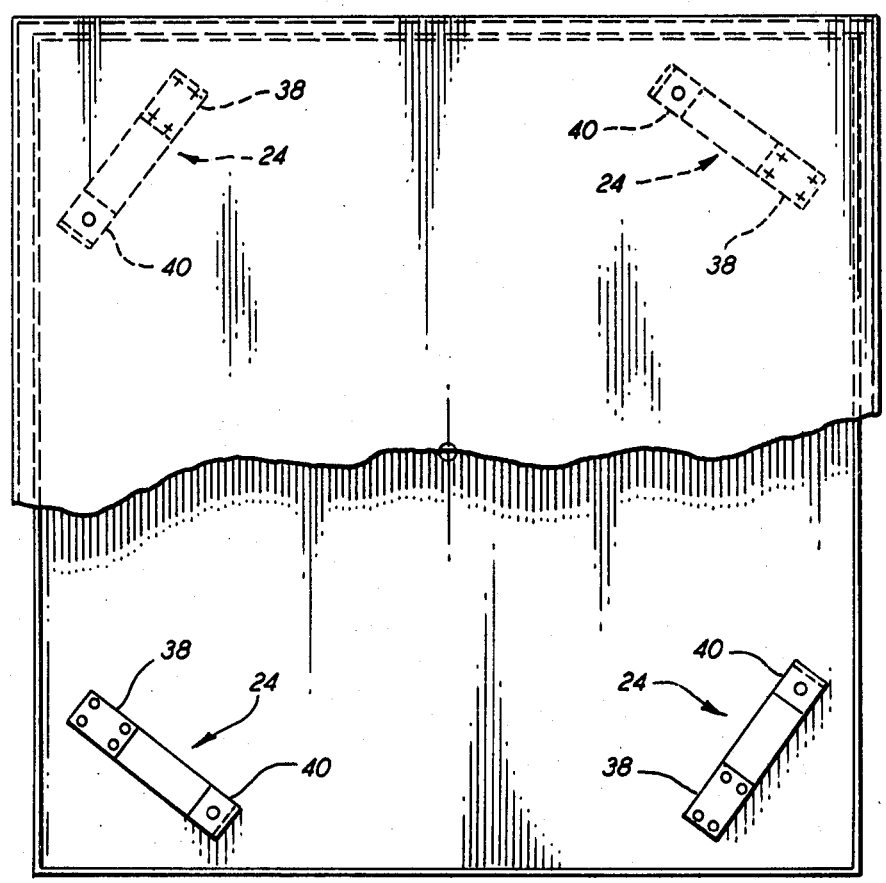
FIG. 3 is a plan view, partly in section, illustrating an embodiment of the invention.

The base 12 has a center point 22 (see FIG. 3) and at least three transducers 24 mounted thereon. In the embodiment shown in FIG. 3, four transducers are employed.

Figure 2:
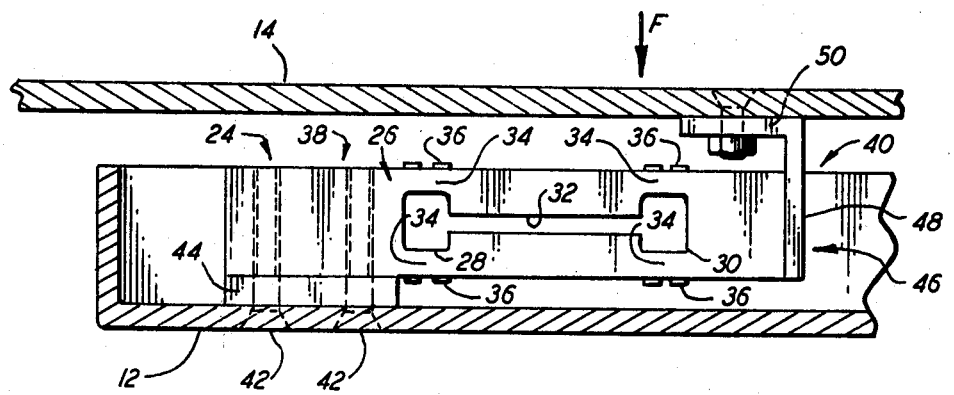
FIG. 2 is a sectional, elevational view of a transducer employed with the invention.

A typical transducer 24 is shown in FIG. 2 and comprises a metal bar 26 having holes 28 and 30 therein connected by a slot 32. This construction provides hinge points 34 where stress is concentrated to provide greater output for strain gages 36. Transducer 24 has ends 38 and 40, one of which, for example 38, is fixedly mounted to the base 12 as by bolts 42. The transducers 24 are approximately equally spaced apart and their mounted ends 38 are substantially the same radial distance from center point 22. The longitudinal axis of each of the transducers 24 is tangentially arrayed with respect to center point 22; i.e., with respect to an imaginary circle having its center at 22. A mounting block 44 is positioned between the end 38 and base 12 so that the body of the transducer is above the base 12 and has a degree of movement relative thereto.

End 40 of transducer 24 carries platform mounting means 46 which in FIG. 2 is an inverted "L" shaped bracket having a leg 48 attached to end 40 and a leg 50 attached to platform 14.

Figure 6:
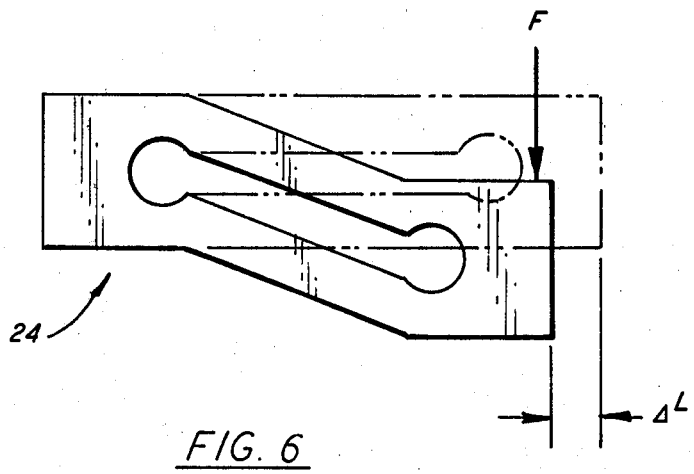
FIG. 6 is a diagrammatic view showing the change in length of the transducer.

When a force F is applied, end 40 deflects downwardly, and a change in length, $\Delta L$, occurs in transducers 24 as shown in FIG. 6. In the prior art devices, when multiple transducers of this type were employed, it was possible for this change in length to create stresses in the weighing platform, which stresses acted against deformation of the transducers and resulted in non-linearity and inaccuracy.

The transducer mounting arrangement shown herein (FIG. 3) reduces these stresses by translating the deformation of the transducers into a slight rotary motion of the platform 14. To accomplish this it is necessary that all of the transducers point in the same direction; i.e., either clockwise or counter clockwise.

When four transducers are employed, they are spaced approximately 90° apart; when three are used, they are spaced 120° apart; and so on.

If the force applied is not centrally located on platform 14 some stress will be introduced, but not as much as in other mounting systems.

Figure 4:
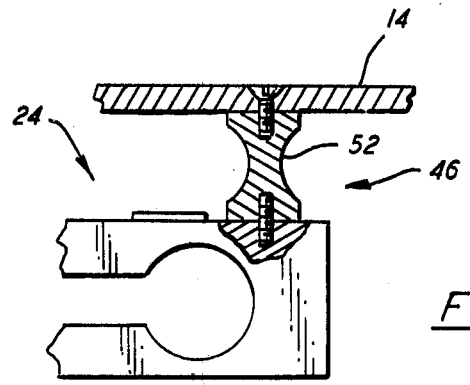
FIGS. 4 and 5 illustrate alternate means for mounting the platform to the transducers.
Figure 5:
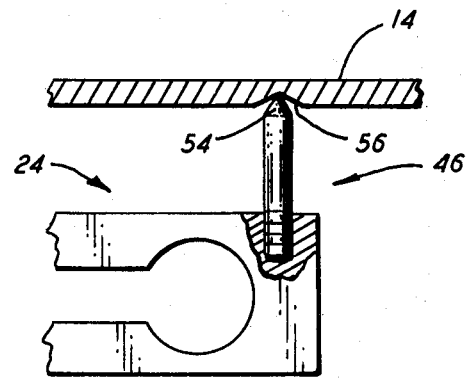

As the platform 14 rotates due to the deformation of the transducers upon the application of a force, a slight twisting moment results in platform mounting means 46. This twisting moment can be minimized by providing a mounting means that is axially stiff but torsionally soft such as mounting means 46 with a reduced cross-section as shown in FIGS. 4 and 5. In FIG. 4 the mounting means 46 is hour-glass shaped and has an area 52 of reduced cross-section.

Platform mounting means 46 can also be formed as shown in FIG. 5, with a conical top 54 fitting into a conical depression 56 formed in the underside of platform 14.

With the mounting arrangements shown herein a platform scale has been constructed that is linear to within 0.01% of full scale.

This accuracy is ideally suited to monitoring the weight of patients undergoing dialysis treatments, where such weight monitoring is critical to the treatment.

While there have been shown what are at present considered to be the preferred embodiments of the invention, it will be apparent to those skilled in the art that various changes and modifications can be made herein without departing from the scope of the invention as defined by the appended claims.

What is claimed is:

1. A platform scale comprising a base member having a central point; at least three elongated transducers having two ends operatively mounted upon said base member by one of their ends, said transducers being substantially equally spaced apart and having their mounted ends substantially the same radial distance from said central point and being tangentially arrayed with respect to said central point; the other end of said transducers carrying platform mounting means; and a platform mounted upon said platform mounting means.

2. The scale of claim 1 wherein said platform mounting means extend upwardly from said transducers and include a first portion having a cross-section having a given area and a second section portion having a cross-section providing an area less than said given area.

3. The scale of claim 1 wherein said transducers are mounted to translate the deflecting force applied thereto into rotational movement of said platform.